United States Patent [19]

Chiou et al.

[11] Patent Number: 4,921,353
[45] Date of Patent: May 1, 1990

[54] HIGH SPEED PHOTOREFRACTIVE IMAGE COMPARATOR

[75] Inventors: Arthur E. Chiou, Newbury Park; Tallis Y. Chang, Thousand Oaks; Mohsen Khoshnevisan, Newbury Park, all of Calif.

[73] Assignee: Rockwell International Corporation, El Segundo, Calif.

[21] Appl. No.: 215,092

[22] Filed: Jul. 5, 1988

[51] Int. Cl.⁵ .............................................. G01B 9/021
[52] U.S. Cl. ................................................... 356/347
[58] Field of Search ................ 356/345, 347, 350, 359

[56] References Cited

U.S. PATENT DOCUMENTS

| | | |
|---|---|---|
| 4,025,195 | 5/1977 | Ebersole et al. |
| 4,082,429 | 4/1978 | Ward, III et al. |
| 4,082,431 | 4/1978 | Ward, III |
| 4,124,278 | 11/1978 | Grinberg et al. |
| 4,212,536 | 7/1980 | Beneze et al. |
| 4,227,805 | 10/1980 | Schiller |
| 4,277,137 | 7/1981 | Upatnieks et al. |
| 4,320,966 | 3/1982 | Reyblatt |
| 4,372,649 | 2/1983 | Kellie |
| 4,500,855 | 2/1985 | Feinberg |
| 4,571,080 | 2/1986 | Papuchon et al. ................ 356/347 |
| 4,575,245 | 3/1986 | Bordé ................................ 356/345 |
| 4,575,247 | 3/1986 | Tansey .............................. 356/359 |
| 4,637,056 | 1/1987 | Sherman et al. |
| 4,651,297 | 3/1987 | Schlunt |
| 4,765,740 | 7/1988 | Fischer ............................. 356/350 |

OTHER PUBLICATIONS

Aub-Mostafa, et al., Optical Neural Computers, Scientific American, p. 88 (Mar., 1987).
Anderson, et al., Optical Tracking Novelty Filter, Optics Letters, vol. 12, p. 123 (1987).
Chiou, et al., Parallel Image Subtraction Using a Phase-Conjugate Michelson Interferometer, Optics Letters, vol. 11, p. 306 (1986).
Feinberg, Continuous-Wave Self-Pumped Phase Conjugator with Wide Field of View, Optics Letters, vol. 8, p. 480 (1983).
Feinberg, Self-Pumped, Continuous-Wave Phase Conjugator Using Internal Reflection, Optics Letters, vol. 7, p. 486 (1982).
Indebetouw, Real-Time Incoherent Subtraction of Irradiance, Applied Optics, vol. 19, p. 1218 (1980).
Ja, Real time Image Subtraction in Four-Wave Mixing with Photorefractive $Bi_{12}OBeO_{20}$ Crystals, Optics Communications, vol. 42, p. 377 (1982).
Kwong, et al., Real Time Image Subtraction and "Exclusive OR" Operation Using a Self-Pumped Phase Conjugated Mirror, Applied Physics Ltrs., vol. 48, p. 201 (1986).
Patorski, Subtraction and Addition of Optical Signals Using a Double-Grating Shearing Interferometer, Optics Communications, vol. 29, p. 13 (1979).
Yu, et al, Incoherent Image Addition and Subtraction: A Technique, Applied Optics, vol. 18, p. 2705 (1979).

Primary Examiner—Léon Scott, Jr.
Attorney, Agent, or Firm—John J. Deinken

[57] ABSTRACT

A phase conjugate interferometer for combining first and second two dimensional images includes a source of coherent light and a first beam splitter for dividing the coherent light into a transmitted beam and a reflected pump beam. A second beam splitter divides the transmitted beam into a reflected first probe beam which traverses a first image transparency and a transmitted second probe beam which traverses a second image transparency. A nonlinear optical medium receives the reflected pump beam, the first probe beam, and the second probe beam, with the medium, the pump beam, and the probe beams being oriented such that self-pumping of the reflected pump beam produces counterpropagating pump beams, four-wave mixing between the counterpropagating pump beams and the first probe beam produces a phase-conjugated first output beam which traverses the first image transparency, and four-wave mixing between the pump beam and the second probe beam produces a phase-conjugated second output beam which traverses the second image transparency. The second beam splitter, the first output beam, and the second output beam are oriented such that a portion of the first output beam is transmitted by the second beam splitter and combines with a portion of the second output beam reflected by the second beam splitter to produce a combined output beam containing the difference between the intensities of the first and second image transparencies.

16 Claims, 1 Drawing Sheet

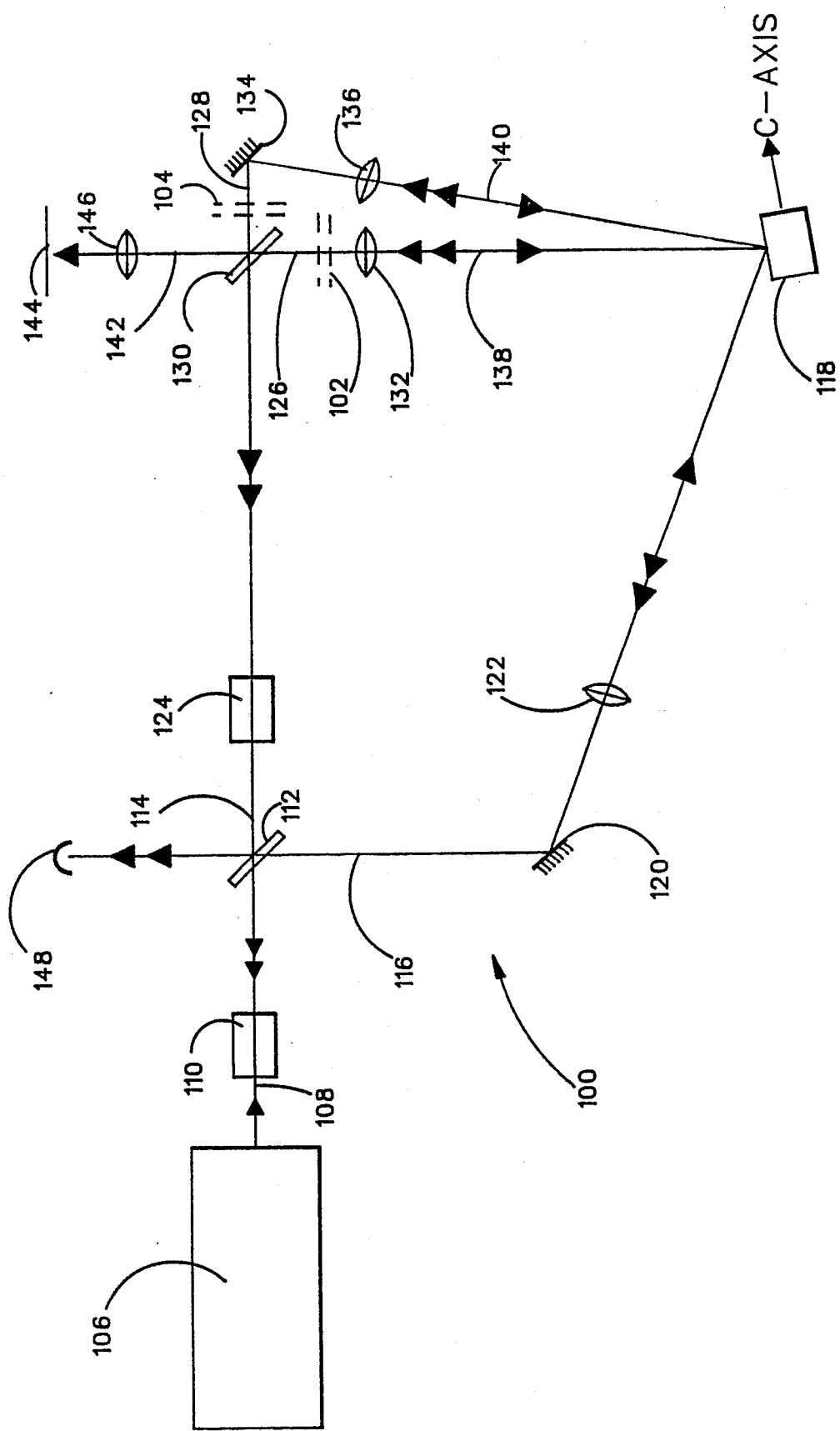

HIGH SPEED PHOTOREFRACTIVE IMAGE COMPARATOR

BACKGROUND OF THE INVENTION

This invention is concerned with techniques for determining the difference between two optical images.

Real-time image processing is becoming an area of great interest in fields, such as robotics, which require the recognition and tracking of objects. A clear advantage to the optical approach for these applications is the capability of parallel processing, with its concomitant increase in processing speed over digital computing techniques. Additional applications for optical image processing include industrial quality assurance, optical logic gates, and the detection of motion in a scene.

In principle, coherent image subtraction and addition can be achieved with an interferometer, such as the Mach-Zender or Michelson configurations. Image subtraction is accomplished with an interferometer by destructive interference, which requires that the phases of the illuminating beams be 180° out of phase throughout the two dimensional region within which the images overlap. In practice, however, the intensity of the overlapped image in an interferometer tends to drift between its maximum and its minimum. This error is caused by phase fluctuations due to ambient air currents and thermal drift. Another disadvantage of the conventional interferometric approach arises from the exact alignment which is required, because such interferometers are extremely sensitive to misalignment.

A phase-conjugate interferometric image subtracter has been developed to alleviate these problems with the conventional interferometric approach (See Chiou and Yeh, Phase-Conjugate Interferometric Coherent Image Subtraction, U.S. Pat. No. 4,718,749). This coherent image subtracter is self aligning, independent of the optical path length of the interferometer arms (as long as the difference between the two optical path lengths is within the coherence length of the laser light), and is self-corrected for slow phase fluctuations due to air currents or thermal drift. In spite of these advantages, however, there are some limitations to this design. Because this image subtracter relies on self-pumped phase conjugation, the two input beams must compete for the gain needed to initiate and stabilize the self-pumped phase conjugation process. Consequently, the process tends to be slow and unstable. As the self-pumped phase conjugate reflectivity depends not only on the input beam intensity but also on the direction and position of the input beam relative to the photorefractive crystal, a very delicate balancing of the two input beam intensities is also required to achieve equal phase conjugate reflectivities for the two arms. This balancing can be particularly difficult when the input beams are encoded with complicated image information.

Therefore, a need has developed in the art for an improved coherent interferometric image subtraction scheme which can initiate and stabilize the self-pumped phase conjugation process with a low input intensity, minimal time delay, and over a wide dynamic range of image intensities.

SUMMARY OF THE INVENTION

With the advent of this invention, parallel image subtraction can be performed at high speed and with a wide dynamic range, yielding high spatial resolution.

A phase conjugate interferometer for combining first and second two dimensional images includes, according to this invention, a source of coherent light and a first beam splitter for dividing the coherent light into a transmitted beam and a reflected pump beam. A second beam splitter divides the transmitted beam into a reflected first probe beam which traverses a first image transparency and a transmitted second probe beam which traverses a second image transparency. A nonlinear optical medium receives the reflected pump beam, the first probe beam, and the second probe beam, with the medium, the pump beam, and the probe beams being oriented such that self-pumping of the reflected pump beam produces counterpropagating pump beams, four-wave mixing between the counterpropagating pump beams and the first probe beam produces a phase-conjugated first output beam which traverses the first image transparency, and four-wave mixing between the pump beam and the second probe beam produces a phase-conjugated second output beam which traverses the second image transparency. The second beam splitter, the first output beam, and the second output beam are oriented such that a portion of the first output beam is transmitted by the second beam splitter and combines with a portion of the second output beam reflected by the second beam splitter to produce a combined output beam containing the difference between the intensities of the first and second image transparencies.

In more detailed embodiments, the nonlinear medium may be a photorefractive crystal, such as $Ba_{2-x}Sr_x$-$K_{1-y}Na_yNb_5O_{15}$, $BaTiO_3$, $KNbO_3$, or $Sr_{1-x}Ba_xNb_2O_6$. Moreover, the image transparencies may be spatial light modulators.

A method for coherently combining first and second two dimensional images, according to this invention, includes the steps of providing a source of coherent light, dividing the coherent light into a transmitted beam and a pump beam, and dividing the transmitted beam into a first probe beam and a second probe beam. The first probe beam is directed through a first image transparency, while the second probe beam is directed through a second image transparency. The pump beam and the first and second probe beams are directed into a nonlinear medium, the medium being oriented with respect to the pump beam such that self-pumping of the pump beam produces counterpropagating pump beams within the medium. The probe beams are oriented with respect to the medium and the counterpropagating pump beams such that four-wave mixing between the pump beam and the first probe beam produces a phase-conjugated first output beam and four-wave mixing between the pump beam and the second probe beam produces a phase-conjugated second output beam. Finally, the first output beam and the second output beam are combined such that interference between the beams produces a combined output beam containing the difference between the intensities of the first and second images.

In more particular embodiments, the first probe beam is directed through the first image transparency with the axis of the first probe beam perpendicular to the plane of the first image transparency and the second probe beam is directed through the second image transparency with the axis of the second probe beam perpendicular to the plane of the second image transparency. In addition, the probe beam, the first probe beam, and the second probe beam may be focussed in the nonlinear medium, while the output beam may be imaged on an output plane.

DESCRIPTION OF THE DRAWINGS

The drawing FIGURE is a schematic diagram depicting a preferred embodiment of a phase-conjugate interferometer constructed according to the present invention.

DESCRIPTION OF THE INVENTION

The phase conjugate interferometer of this invention provides dynamically stable parallel image subtraction using a high speed, wide dynamic range phase conjugate interferometric process which yields high spatial resolution. The process of this invention is particularly versatile since its operation is not affected by misalignment or optical path length perturbations. The time reversing character of the phase-conjugated beams used in the invention ensures that relative phase delays, due to any optical path differences, and slow phase fluctuations, arising from air currents along the beam paths and/or thermal drifts, are exactly cancelled after the round trip passage of the beams from the beam splitter to the phase conjugator.

The drawing figure is a schematic diagram depicting a preferred embodiment of a phase-conjugate interferometer 100 constructed according to the present invention. The interferometer is used to combine a first two dimensional image transparency 102 and a second image transparency 104. A laser 106 (such as an argon ion laser, operating at 488 nm) provides a source of coherent light 108. The light 108 is directed through a Faraday cell 110 to prevent any light from returning along the beam path and interfering with the operation of the laser. A first beam splitter 112 divides the coherent light into a transmitted beam 114 and a reflected pump beam 116. The pump beam is directed toward a nonlinear medium 118, such as the "a" face of a barium titanate ($BaTiO_3$) photorefractive crystal, by a first mirror 120 and focussed on the crystal by a first lens 122. The pump beam is polarized in the xz plane (i.e., the plane of incidence) so that it will excite only extraordinary waves in the crystal. The pump beam is typically arranged to impinge on the crystal with an angle of incidence of approximately 40° with respect to the normal to the incident face of the crystal, although a wide range of angles between approximately 0° and 60° can be used.

The transmitted beam is spatially filtered, then expanded in cross section and collimated to a useful diameter (e.g., 1 cm) by a spatial filter and beam expander 124. The transmitted beam is then divided into a reflected first probe beam 126 and a transmitted second probe beam 128 by a second beam splitter 130. The first probe beam traverses the first image transparency 102 and is focussed on the crystal 118 by a second lens 132, while the second probe beam traverses the second image transparency 104 and is directed toward and focussed onto the crystal by a second mirror 134 and a third lens 136, respectively. Although image transparencies are used in the exemplary embodiment to simplify the explanation of the inventive concept, those skilled in the art will appreciate that the image transparencies could be replaced by spatial light modulators in other embodiments of this invention.

The pump beam is oriented with respect to the c-axis of the crystal so that self-pumping of the pump beam within the crystal produces counterpropagating pump beams. The probe beams are oriented with respect to the c-axis and the pump beams so that four-wave mixing within the crystal between the counterpropagating pump beams and the first probe beam 126 produces a phase-conjugated first output beam 138 which retraces the path of the probe beam 126, traversing the first image transparency 102 and propagatng into the second beam splitter 130. Similarly, four-wave mixing between the counterpropagating pump beams and the second probe beam 128 inside the crystal produces a phase-conjugated second output beam 140 which traverses the second transparency 104 and returns to the second beam splitter. A portion of the first output beam is transmitted by the beam splitter 130 and combines with a portion of the second output beam which is reflected by the beam splitter, producing a combined output beam 142 which contains the difference between the intensities of the first and second images. This output beam is imaged onto the output plane 144 (a detector array could be used as well) by a fourth lens 146. Since the output beam contains the difference between the intensities of the two transparencies, it represents the subtraction of one image from the other. In practice, the subtracted image intensity may differ slightly from the theoretical value because the phase-conjugate reflectivity will depend on the intensity, orientation, and position of the incident beams. A beam dump 148 absorbs any returning light reflected by the first beam splitter 112.

The pump beam is provided with an intensity considerably stronger (e.g., 10 times or greater) than the intensities of the probe beams. The direction of the pump beam is optimized for self-pumping within the crystal to establish a pair of phase conjugate loops of counterpropagating pumping beams inside the photorefractive gain medium independent of the existence of the other input beams. These counter-propagating pumping beams in the gain medium provide the required matched pumps to phase conjugate the two probe beams via a nonlinear four-wave mixing process. Since the phase conjugation of the probe beams does not rely upon the competing self-pumping process, both the speed and the dynamic range of the device are improved by two to three orders of magnitude. The embodiment of the invention illustrated in FIG. 1, for example, has been found to operate with a speed on the order of 1 ms, with a dynamic range from 0.1 mW to 100 mW and spatial resolution on the order of 10 lines per millimeter, although the spatial resolution is not limited by the phase conjugation process.

The preferred embodiments of this invention have been illustrated and described above. Modifications and additional embodiments, however, will undoubtedly be apparent to those skilled in the art. Other photorefractive crystals, for example, such as $Ba_{2-x}Sr_x$-$K_{1-y}Na_yNb_5O_{15}$, $KNbO_3$, and $Sr_{1-x}Ba_xNb_2O_6$, could be used as the nonlinear element. In each case the crystal is cut so that internal reflections of nonlinearly amplified scattered light are optimized to promote self-pumped phase conjugation (See Feinberg, Continuous-wave self-pumped phase conjugator with wide field of view, Optics Letters, Volume 8, Page 480 (1983)). Furthermore, nonlinear media other than photorefractive crystals could also be used in this invention. Other embodiments using the invention could employ separate nonlinear media for the phase conjugation of each probe beam. To operate properly the two phase-conjugate reflectors would have to be locked together in phase. This lock-in will occur if the two reflectors are located reasonably close to one another with an optical path between them. In addition, this technique is also useful to achieve intensity inversion of an image, which is a special case of image subtraction obtained by removing one of the transparencies so that the transmittance becomes unity in one arm. The phase conjugate image subtracter of this invention can also perform logic operations. Consider the case where both transparencies are binary, i.e., either completely transmitting (equivalent to a binary value of 1) or opaque (a binary value of 0). A complete cancellation would require that the two transparencies be identical. An output intensity of 1 would appear in this logic element when only one of the two transparencies transmitted. Thus such an image subtracter can act as an exclusive-OR (XOR) gate. If the transparencies are encoded with a matrix of binary data, such an image subtracter can act as a two-dimensional array of XOR gates. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teachings of Chiou and Yeh, Phase-Conjugate Interferometric Coherent Image Subtraction, U.S. Pat. No. 4,718,749, and Feinberg, Continuous-wave self-pumped phase conjugator with wide field of view, Optics Letters, Volume 8, Page 480 (1983), which are referred to above, are incorporated by reference.

We claim:

1. A phase conjugate interferometer for combining first and second two dimensional images, comprising:
    a source of coherent light;
    a first beam splitter for dividing the coherent light into a transmitted beam and a reflected pump beam;
    a second beam splitter for dividing the transmitted beam into a reflected first probe beam which traverses the first image, and a transmitted second probe beam which traverses the second image; and
    a nonlinear optical medium means for receiving the reflected pump beam, the first probe beam, and the second probe beam,
    the medium, the pump beam, and the probe beams being oriented such that self-pumping of the reflected pump beam produces counterpropagating pump beams, four-wave mixing between the counterpropagating pump beams and the first probe beam produces a phase-conjugated first output beam which traverses the first image, and four-wave mixing between the pump beam and the second probe beam produces a phase-conjugated second output beam which traverses the second image,
    the second beam splitter, the first output beam, and the second output beam being oriented such that a portion of the first output beam having a first output intensity is transmitted by the second beam splitter and combines with a portion of the second output beam having a second output intensity and reflected by the second beam splitter to produce a combined output beam containing the difference between the first and second output intensities.

2. The interferometer of claim 1, wherein the nonlinear medium further comprises a photorefractive crystal.

3. The interferometer of claim 2, wherein the photorefractive crystal is selected from the group consisting of $Ba_{2-x}Sr_xK_{1-y}Na_yNb_5O_{15}$, $BaTiO_3$, $KNbO_3$, and $Sr_{1-x}Ba_xNb_2O_6$.

4. The interferometer of claim 1, wherein the first image is imposed on the first probe beam by a first spatial light modulator and the second image is imposed on the second probe beam by a second spatial light modulator.

5. The interferometer of claim 1, wherein the first probe beam is further oriented to pass through the first image with the axis of the first probe beam perpendicular to the plane of the first image and the second probe beam is further oriented to pass through the second image with the axis of the second probe beam perpendicular to the plane of the second image.

6. The interferometer of claim 1, further comprising a first lens for focussing the pump beam in the nonlinear medium.

7. The interferometer of claim 6, further comprising a second lens for focussing the first probe beam in the nonlinear medium and a third lens for focussing the second probe beam in the nonlinear medium.

8. The interferometer of claim 7, further comprising a fourth lens for imaging the output beam on an output plane.

9. A method for coherently combining first and second two dimensional images, comprising the steps of:
    providing a source of coherent light;
    dividing the coherent light into a transmitted beam and a pump beam;
    dividing the transmitted beam into a first probe beam and a second probe beam;
    directing the first probe beam through the first image;
    directing the second probe beam through the second image;
    directing the pump beam and the first and second probe beams into a nonlinear medium;
    orienting the medium with respect to the pump beam such that self-pumping of the pump beam produces counterpropagating pump beams within the medium;
    orienting the probe beams with respect to the medium and the counterpropagating pump beams such that four-wave mixing between the pump beam and the first probe beam produces a phase-conjugated first output beam having a first output intensity and four-wave mixing btween the pump beam and the second probe beam produces a phase-conjugated second output beam having a second output intensity; and
    combining the first output beam and the second output beam such that interference between the beams produces a combined output beam containing the difference between the first and second output intensities.

10. The method of claim 9, wherein the nonlinear medium further comprises a photorefractive crystal.

11. The method of claim 10, wherein the photorefractive crystal is selected from the group consisting of $Ba_{2-x}Sr_xK_{1-y}Na_yNb_5O_{15}$, $BaTiO_3$, $KNbO_3$, and $Sr_{1-x}Ba_xNb_2O_6$.

12. The method of claim 9, wherein the step of directing the first probe beam through a first image further comprises:
    directing the first probe beam through a first spatial light modulator and wherein the step of directing the second probe beam through a second image further comprises:

directing the second probe beam through a second spatial light modulator.

13. The method of claim 9, wherein the steps of directing the first probe beam through the first image and directing the second probe beam through the second image further comprise the steps of:

directing the first probe beam through the first image with the axis of the first probe beam perpendicular to the plane of the first image;

and directing the second probe beam through the second image with the axis of the second probe beam perpendicular to the plane of the second image.

14. The method of claim 9, further comprising the step of focussing the probe beam in the nonlinear medium.

15. The method of claim 14, further comprising the steps of:

focussing the first probe beam in the nonlinear medium and focussing the second probe beam in the nonlinear medium.

16. The method of claim 15, further comprising the step of imaging the output beam on an output plane.

* * * * *